United States Patent
Koh

(10) Patent No.: US 8,289,474 B2
(45) Date of Patent: Oct. 16, 2012

(54) LINEAR LIGHT SOURCE HOLDING BASE, BACKLIGHT UNIT AND LIQUID CRYSTAL DISPLAY DEVICE

(75) Inventor: Hideki Koh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 215 days.

(21) Appl. No.: 12/679,333

(22) PCT Filed: Jul. 14, 2008

(86) PCT No.: PCT/JP2008/062671
§ 371 (c)(1),
(2), (4) Date: Mar. 22, 2010

(87) PCT Pub. No.: WO2009/041146
PCT Pub. Date: Apr. 2, 2009

(65) Prior Publication Data
US 2010/0182533 A1 Jul. 22, 2010

(30) Foreign Application Priority Data
Sep. 25, 2007 (JP) .................................. 2007-246536

(51) Int. Cl.
*G02F 1/1335* (2006.01)
(52) U.S. Cl. ............................... 349/61; 349/69; 349/70

(58) Field of Classification Search .................. 349/61, 349/69, 70
See application file for complete search history.

(56) References Cited

U.S. PATENT DOCUMENTS

| | | | |
|---|---|---|---|
| 6,459,211 B1 * | 10/2002 | Wang | 315/169.3 |
| 6,722,773 B2 | 4/2004 | Tsai et al. | |
| 7,434,958 B2 * | 10/2008 | Yang et al. | 362/225 |
| 7,961,272 B2 * | 6/2011 | Kim | 349/70 |
| 2006/0018130 A1 | 1/2006 | Lee | |

FOREIGN PATENT DOCUMENTS

| | | | |
|---|---|---|---|
| JP | 2-142347 U | | 12/1990 |
| JP | 7-11747 U | | 2/1995 |
| JP | 10284247 A | * | 10/1998 |
| JP | 2001-210126 A | | 8/2001 |
| JP | 2006-032358 A | | 2/2006 |

OTHER PUBLICATIONS

Official Communication issued in International Patent Application No. PCT/JP2008/062671, mailed on Sep. 9, 2008.

* cited by examiner

*Primary Examiner* — Uyen Chau N Le
*Assistant Examiner* — Chris Chu
(74) *Attorney, Agent, or Firm* — Keating & Bennett, LLP

(57) ABSTRACT

A lamp clip (LC) includes a holding portion (11) having grasping pieces (12 and 12) for grasping a fluorescent tube (71), and a supporting column portion (21) for supporting the holding portion (11). Furthermore, a weight (51) is fitted to the supporting column portion (21).

15 Claims, 6 Drawing Sheets

LINEAR LIGHT SOURCE HOLDING BASE, BACKLIGHT UNIT AND LIQUID CRYSTAL DISPLAY DEVICE

TECHNICAL FIELD

The present invention relates to a holding base holding a linear light source such as a fluorescent tube, a backlight unit including the linear light source, and a liquid crystal display device incorporating such a backlight unit.

BACKGROUND ART

Generally, liquid crystals in liquid crystal display panels do not emit light themselves. Thus, liquid crystal display devices take in sunlight and the like as external light, and utilize that external light to display various images on the liquid crystal display panels. Thus, assuming cases where external light cannot be taken in, the liquid crystal display devices desirably have an irradiation device (a backlight unit) that irradiates the liquid crystals.

Such backlight units are available in various types. For example, as shown in FIG. 6, there is a direct-lit-type backlight unit 182 in which a plurality of fluorescent tubes 171 are arranged in parallel in a manner facing the back face of a liquid crystal display panel (see Patent Document 1).

In such a backlight unit 182, however, the fluorescent tubes 171 have their opposite ends held by lamp holders hd, and have parts of the fluorescent tubes 171 other than their opposite ends held by lamp clips 1c. The fluorescent tubes 171 emit light by an AC signal of several tens of KHz that is fed from an unillustrated inverter. The brightness of the fluorescent tubes 171 emitting light is controlled by an AC signal of 100 to 500 Hz, which is called a light control signal. Patent Document 1: JP-A-2006-32358 (see FIG. 1)

DISCLOSURE OF THE INVENTION

Problems to be Solved by the Invention

In a case with a backlight unit 182 as shown in FIG. 6, there arises a problem if a backlight frame 172 that houses the fluorescent tubes 171 is made of metal (a conductor). That problem results from the distributed capacitance (the parasitic capacitance) generated between the fluorescent tubes 171, to which an AC signal is fed, and the backlight frame 172 made of metal.

Specific description is as follows. Generally, due to the parasitic capacitance generated by the ON signal of an AC signal, electromagnetic force to the fluorescent tubes 171 occurs, and the fluorescent tubes 171 affected by that electromagnetic force are displaced with respect to the backlight frame 172 (are displaced so as to approach the backlight frame 172). On the other hand, the electromagnetic force disappears by the OFF signal of the AC signal, and the fluorescent tubes 171 that are now unaffected by the electromagnetic force tend to return to their original position (are displaced so as to move away from the backlight frame 172).

That is, in response to the electromagnetic force that occurs and disappears by the AC signal, the fluorescent tubes 171 approach and move away from the backlight frame 172, and, as a result, the fluorescent tubes 171 vibrate. Furthermore, the vibration of the fluorescent tubes 171 is transmitted via the lamp clips 1c to the backlight frame 172, thereby vibrating the backlight frame 172 (and also the backlight unit 182).

When the vibration of the backlight frame 172 is caused by the light control signal, the vibration synchronizes with the wavelength band of the AC signal of the light control signal, and becomes a vibration of about 20 to 20000 Hz. The vibration of this wavelength band is included in an audible range of human hearing. Thus, when a liquid crystal display device incorporating such a backlight unit 182 controls the brightness, the user etc. had to hear unpleasant noise (noise).

The present invention has been devised under the above background. An object of the invention is to provide a linear light source holding base that makes the vibration caused by the AC signal fed to a fluorescent tube less likely to be transmitted to a backlight frame, a backlight unit including that linear light source holding base, and furthermore a liquid crystal display device incorporating that backlight unit.

Means for Solving the Problem

According to the present invention, a linear light source holding base comprises: a holding portion comprising a grasping piece that grasps a linear light source; a supporting column portion supporting the holding portion; and a damper fitted to the supporting column portion.

Generally, when a linear light source holding base holding a linear light source is arranged, for example, on an interior surface (mounting surface) of a backlight frame, which is a part of a backlight unit, the linear light source moves away from the mounting surface by the length of the supporting column portion (by the length of a support).

When the linear light source vibrates in such a state, the vibration is transmitted via the linear light source supporting base (the supporting column portion to be specific) to the mounting surface. However, if the supporting column portion is fitted with a weight, that weight weakens the vibration transmitted via the supporting column portion, and thus the vibration is less likely to be transmitted to the mounting surface. As described above, if the vibration is less likely to be transmitted to the mounting surface, namely the interior surface (the bottom surface) etc. of the backlight frame, the backlight frame itself does not vibrate, and thus no noise resulting from the vibration occurs from the backlight unit.

Desirably, the damper is metal. With such a material with a relatively large specific gravity, such as metal, the vibration transmitted to the linear light source holding base can be efficiently weakened.

From a viewpoint of efficiently weakening the vibration transmitted to the linear light source holding base, the following structure is desirable.

That is, desirably, the supporting column portion is also metal (the point is, at least one of the damper and the supporting column portion is desirably metal).

With a view to stably holding the supporting column portion and hence the linear light source supported by the supporting column portion, in the linear light source holding base, a base portion is formed on the supporting column portion at an end thereof opposite from where the holding portion is located, the base portion supporting the supporting column portion. Desirably, the base portion is metal.

With a view to achieving stable mounting of the linear light source on the mounting surface, in the linear light source holding base, an engagement portion engaging with the mounting surface is formed on the base portion. Desirably, the engagement portion is metal.

In the linear light source holding base, the holding portion comprises: as the grasping piece, a plurality of them; and a branch piece connecting the grasping pieces. Desirably, the branch piece is metal.

A backlight unit comprising the linear light source holding base described above and a linear light source held by such a linear light source holding base can also be said to be the present invention. Furthermore, a liquid crystal display device comprising such a backlight unit and a liquid crystal display panel receiving light from that backlight unit can also be said to be the present invention.

Advantages of the Invention

According to the present invention, simply including a damper in a linear light source holding base makes the vibration of a light source less likely to be transmitted to a mounting surface of the linear light source holding base. Thus, a member (for example, a backlight frame) including a mounting surface is less likely to vibrate, and thus the noise resulting from the vibration is less likely to occur.

LIST OF REFERENCE SYMBOLS

Figure 1:
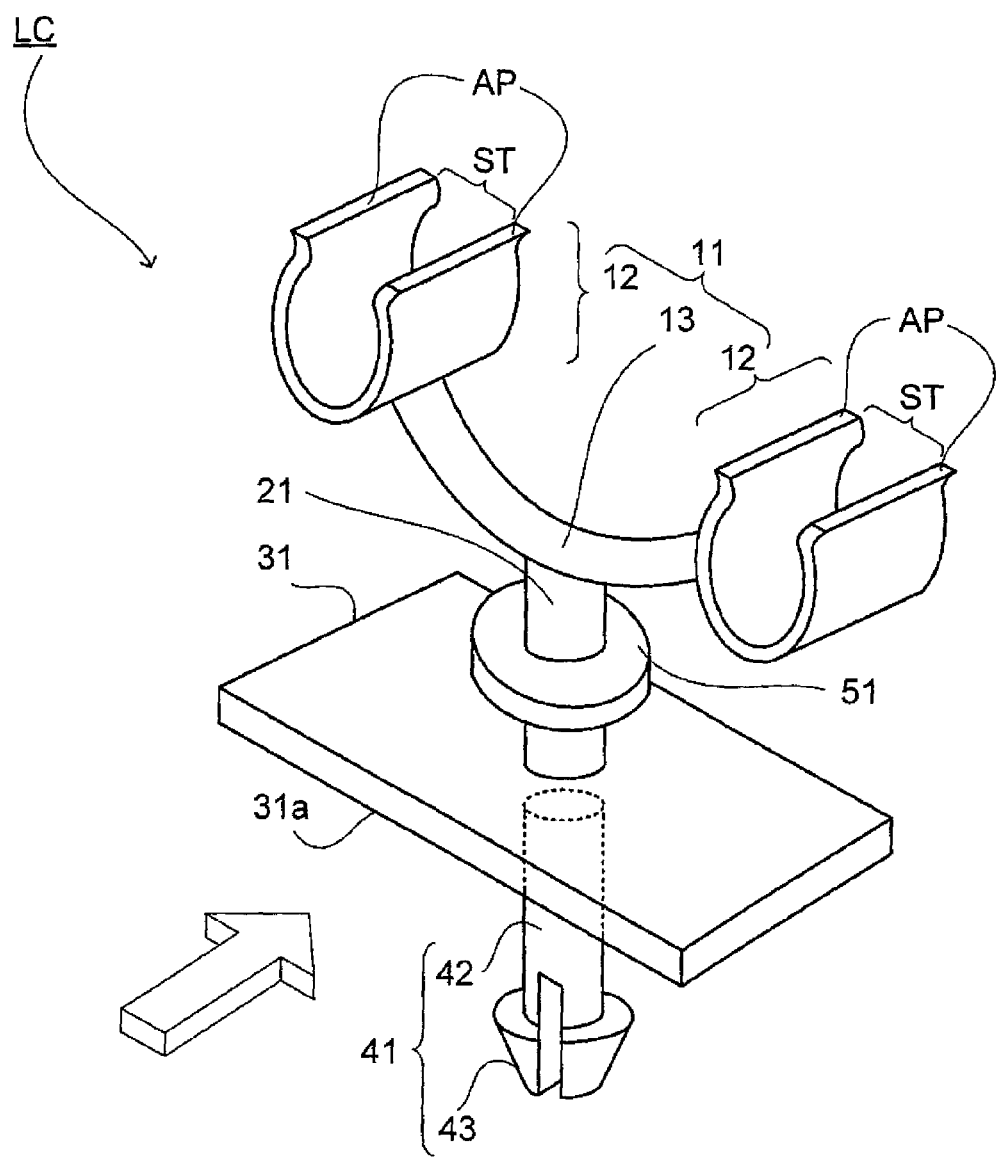
FIG. 1 A perspective view of a lamp clip included in a backlight unit.

LC lamp clip (linear light source holding base)
11 holding portion
12 grasping piece
13 branch piece
21 supporting column portion
31 base portion
31a rear surface of the base portion
41 engagement portion
42 project piece
43 catch piece
51 weight (damper)
71 fluorescent tube (linear light source)
72 backlight frame
72a interior surface (mounting surface) of the backlight frame
73 diffusion sheet
74 optical sheet
81 liquid crystal display panel
82 backlight unit
89 liquid crystal display device

BEST MODE FOR CARRYING OUT THE INVENTION

First Embodiment

A first embodiment of the present invention will be described below with reference to the relevant drawings. For the sake of convenience, a reference sign or the like of a member may be omitted; in such a case, another drawing will be referred to.

Figure 4:
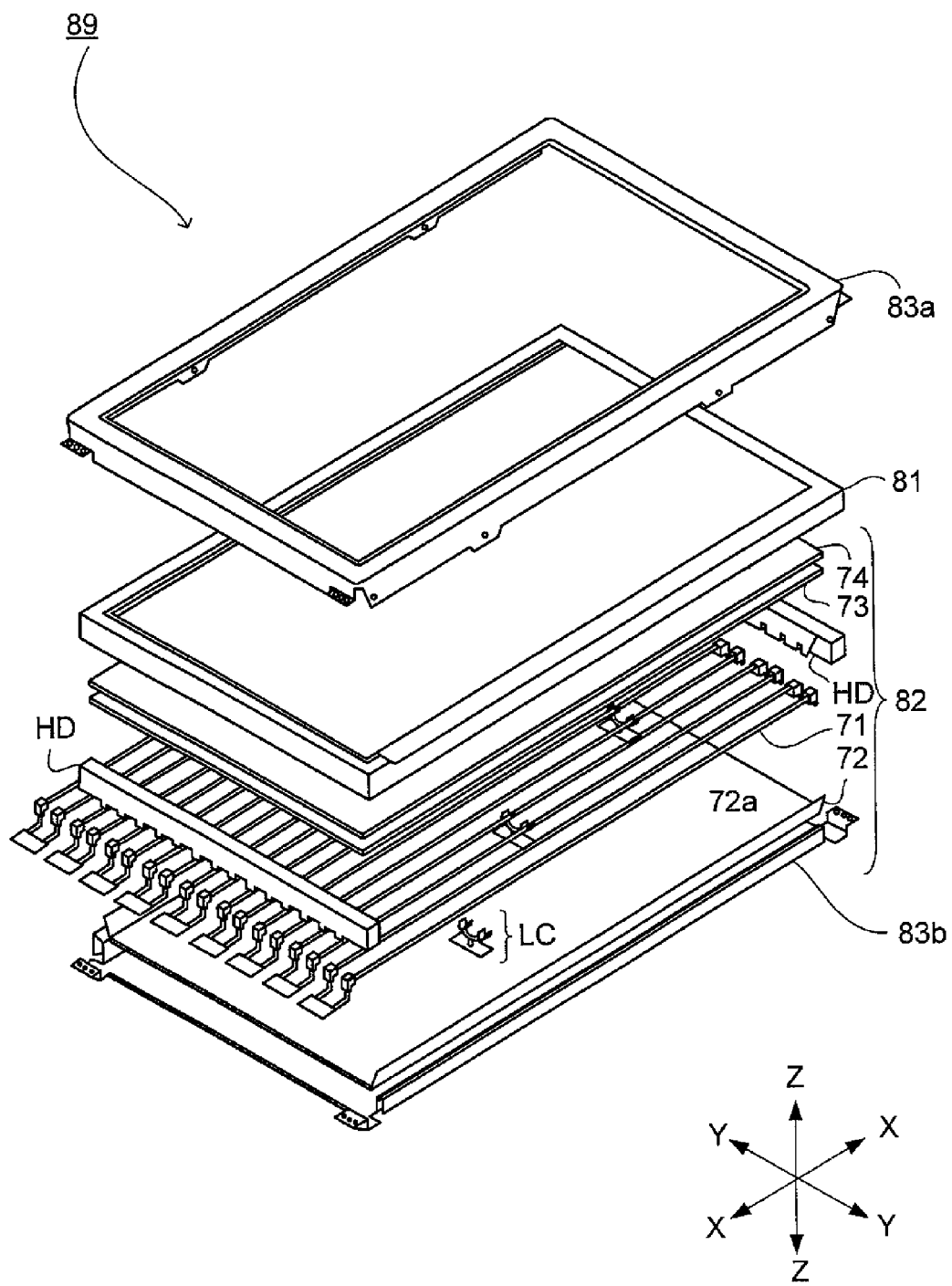
FIG. 4 An exploded perspective view of a liquid crystal display device.

FIG. 4 is an exploded perspective view of a liquid crystal display device. As shown in this diagram, the liquid crystal display device 89 includes a liquid crystal display panel 81, a backlight unit 82, and a bezel 83 (83a and 83b) for housing these.

The liquid crystal display panel 81 is a nonluminous-type display panel, and exerts a display function by receiving light (backlight) from the backlight unit 82. Thus, if the light from the backlight unit 82 can uniformly irradiate the entire surface of the liquid crystal display panel 81, the display quality of the liquid crystal display panel 81 can be improved.

To generate backlight, the backlight unit 82 includes a fluorescent tube (a light source) 71, a backlight frame 72, a diffusion sheet 73, and an optical sheet 74.

The fluorescent tube (the linear light source) 71 is linear (bar-like, cylindrical, or the like), and, as the fluorescent tube, a plurality of them are incorporated in the backlight unit 82 (note that, for the sake of convenience, only some of them are shown in the drawing).

Such fluorescent tubes 71 are incorporated in the backlight unit 82 with their opposite ends supported by lamp holders HD. In addition, to incorporate the fluorescent tubes 71 further stably in the backlight unit 82, lamp clips LC that grasp the fluorescent tubes 71 are also incorporated (details will be described later).

The type of the fluorescent tubes 71 is not limited, and they may be, for example, cold cathode tubs or hot cathode tubes. In the following description, the direction in which the fluorescent tubes 71 are arrayed in parallel (the direction in which the fluorescent tubes 71 are arrayed linearly) will be referred to as the Y direction, the direction in which the fluorescent tubes 71 extend will be referred to as the X direction, and the direction vertical to both the Y and the X directions will be referred to as the Z direction.

The backlight frame 72 is a member having the shape of a box with one face open, and has the interior surface of the box covered with reflective resin, metal, or the like (a reflective sheet). Inside the box, the fluorescent tubes 71 are located. Thus, part of the radiation light (the light radiated from the fluorescent tubes 71) emitted from the fluorescent tubes 71 is reflected to be led to the open face.

A member forming the backlight frame 72 itself may be made of reflective resin, metal, or the like. In this way, the resin, metal, or the like for covering the interior surface of the backlight frame 72 can be omitted.

The diffusion sheet 73 is formed of resin such as polyethylene terephthalate having functions of scattering and diffusing light, and is so located as to cover the fluorescent tubes 71 arrayed in parallel. Thus, when the light that has advanced from the fluorescent tubes 71 enters the diffusion sheet 73, the light scatters and diffuses and pervades in the in-plane direction.

The optical sheet 74 is a lens sheet having, for example, a lens shape in the sheet surface thereof so as to deflect (converge) the radiation characteristics of light, and is so located as to cover the diffusion sheet 73. Thus, when the light that has advanced from the diffusion sheet 73 enters the optical sheet 74, that light converges, and the luminescent brightness per unit area is improved.

That is, in the backlight unit 82, the backlight frame 72, a group of fluorescent tubes 71 arrayed in parallel at the interior surface (the bottom surface) 72a of the backlight frame 72, the diffusion sheet 73, and the optical sheet 74 are laid on one another in this order (note that the laid direction is in the Z direction).

In the backlight unit 82 as described above, the fluorescent tubes 71, which are arrayed in parallel on the backlight frame 72 via the lamp clips LC, emit light by the AC signal fed from an inverter (unillustrated).

The light reaches the diffusion sheet 73 directly, or is reflected at a reflective surface (an interior surface 72a) of the backlight frame 72 and then reaches the diffusion sheet 73. Furthermore, the light that has reached the diffusion sheet 73, by passing through the optical sheet 74 while being diffused, becomes backlight with enhanced luminescent brightness, and emits.

If the fluorescent tubes 71 that emit light by the AC signal from the inverter is located over the interior surface 72a of the metal backlight frame 72—a conductor—, due to the AC signal from the inverter, feeding of the AC signal for light control in particular, there is generated a distributed capacitance (parasitic capacitance) between the fluorescent tubes 71 and the backlight frame 72. Due to the electromagnetic force resulting from the parasitic capacitance, the fluorescent tubes 71 vibrate.

Figure 2:
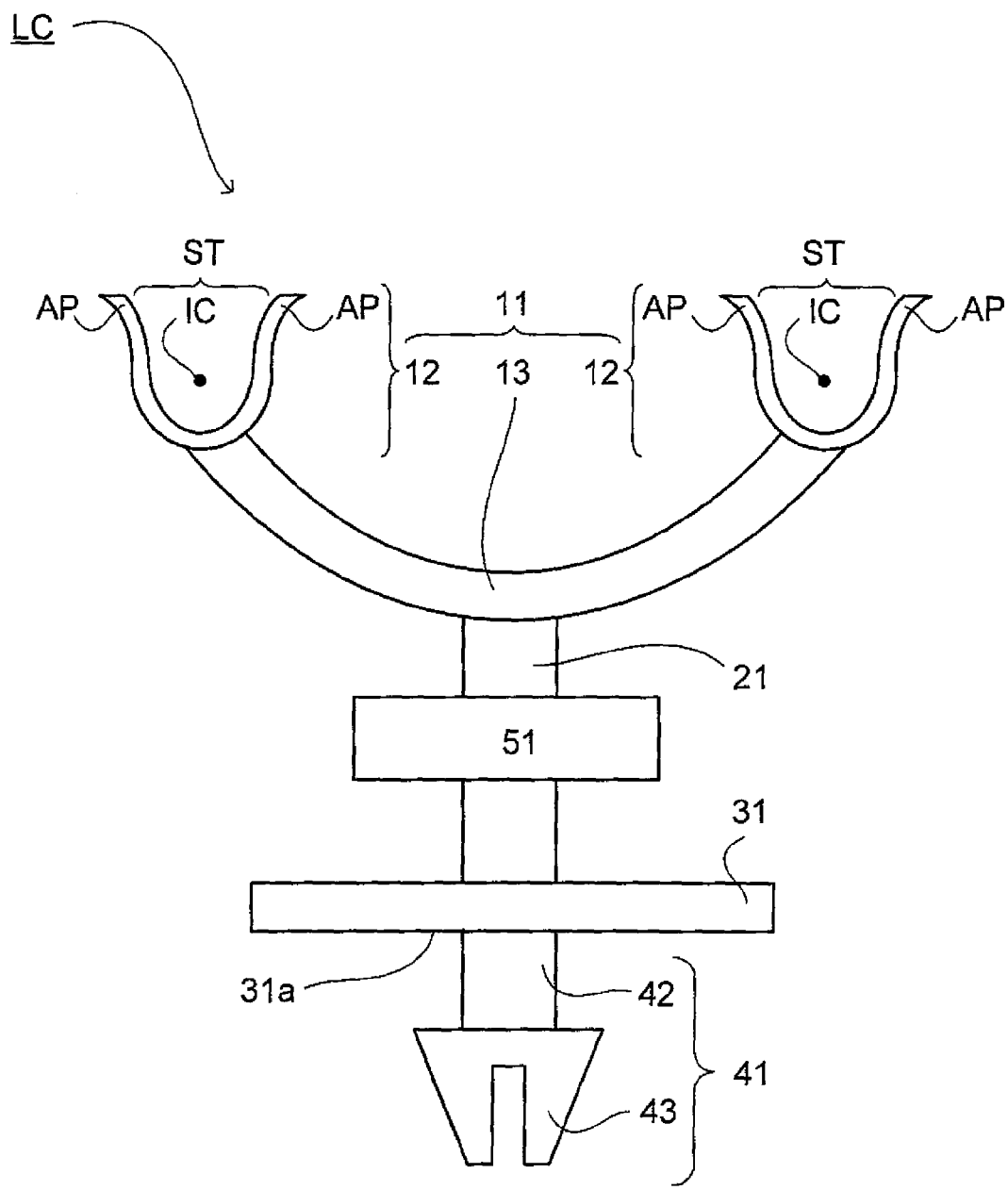
FIG. 2 A front view of the lamp clip in FIG. 1 as seen from the front.
Figure 3:
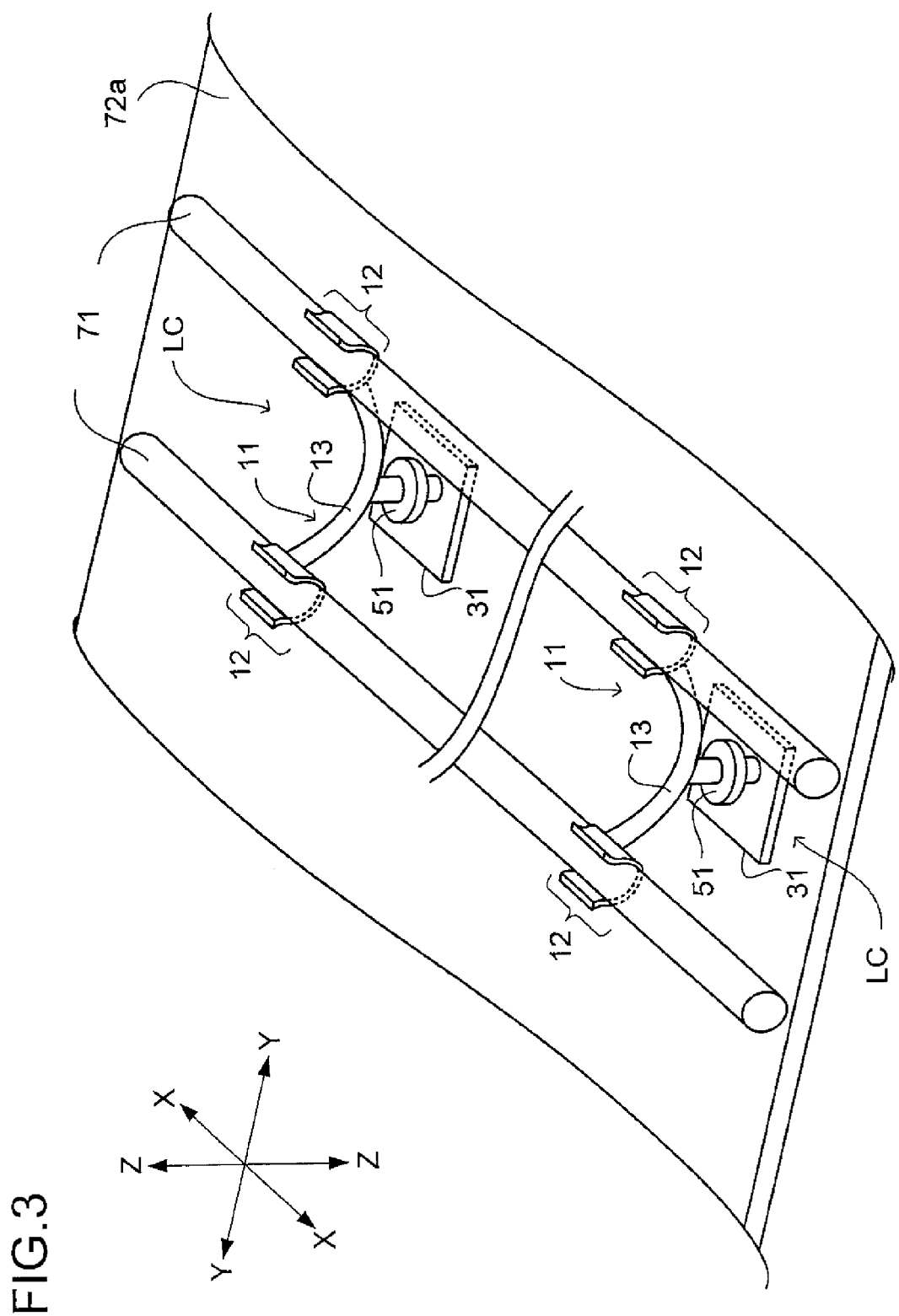
FIG. 3 A perspective view showing a state in which the lamp clip is holding a fluorescent tube in the backlight unit.

A lamp clip (a linear light source holding base) LC holding a fluorescent tube 71 that vibrates will now be described in detail with reference to FIGS. 1 to 3. FIG. 1 is a perspective view of the lamp clip LC, and FIG. 2 is a front view of the lamp clip LC in FIG. 1 as seen from the front (see a white arrow). FIG. 3 is a perspective view showing a state in which the lamp clip LC is holding fluorescent tubes 71.

As shown in these diagrams, the lamp clip LC includes a holding portion 11, a supporting column portion 21, a base portion 31, an engagement portion 41, and a weight (a damper) 51.

The holding portion 11 is a member that holds the fluorescent tube 71, and specifically, includes grasping pieces 12 and 12, and a branch piece 13.

The grasping piece 12 is a member that grasps a side surface of a bar-like (cylindrical or the like) fluorescent tube 71. Thus, when grasping the fluorescent tube 71 having the shape of a cylinder or the like, the grasping piece 12 has the shape of a cylindrical tube provided with a slit ST at a side surface thereof. Since the grasping piece 12 grasps the fluorescent tube 71, the inner diameter of the grasping piece 12 is slightly larger than the outer diameter of the fluorescent tube 71.

The material of the grasping piece 12 is nonmetal, for example, resin. The reason is that, since the grasping pieces 12 and 12 touch the fluorescent tube 71 directly, in a case where they are metal, the AC signal fed for the operation of the fluorescent tube 71 leaks (if the signal leaks, the light intensity of that part diminishes).

The grasping piece 12 includes overhang parts AP and AP which are edge parts of the slit ST. The overhang parts AP and AP widen as they move away from the inner diameter center IC of the grasping piece 12. Thus, the space (between the overhang parts AP and AP) of the slit ST widens as it moves away from the inner diameter center IC of the grasping piece 12.

Being made of resin, such overhang parts AP and AP have elastic force. Thus, when the fluorescent tube 71 is aligned with and pressed against the slit ST, the overhang parts AP and AP move away from each other due to their elasticity. As a result, the fluorescent tube 71 is easily fitted inside the grasping piece 12.

After the fluorescent tube 71 is fitted into the grasping piece 12, the overhang parts AP and AP, that have the space of the slit ST widened, return to their original state (a normal state in which no fluorescent tube 71 is held) due to their elasticity. Then, the overhang parts AP and AP approach each other and press the fluorescent tube 71. As a result, the fluorescent tube 71 is grasped stably without falling out of the grasping piece 12.

The branch piece 13 is a member that connects to support the grasping pieces 12 and 12. There is no particular limitation on the shape of the branch piece 13. For example, as shown in FIGS. 1 and 2, the branch piece 13 may be a member that is curved like a bow or is V-shaped. The point is, the branch piece 13 may be formed so as to connect the grasping pieces 12 and 12.

The material of the branch piece 13 is not particularly limited. Accordingly, the material may be metal or resin. The point is, the branch piece 13 may have a strength that can hold the grasping pieces 12 and 12.

The supporting column portion 21 is a member that supports the holding portion 11. To be specific, the supporting column portion 21 supports the holding portion 11 by being connected to the branch piece 13. There is no particular limitation on the shape of the supporting column portion 21. For example, the supporting column portion 21 may have the shape of a circular cylinder or polygonal cylinder.

There is no particular limitation also on the material of the supporting column portion 21. The material may be metal or resin. The point is, the supporting column portion 21 may have a strength that can support the holding portion 11.

The base portion 31 is formed at an end of the supporting column portion 21, and is a member supporting the supporting column portion. The base portion 31 is located at a position opposite from the position of the holding portion 11 connected to the supporting column portion 21; that is, if the holding portion 11 is located at one end of the opposite ends of the supporting column portion 21, the base portion 31 is located at the other end.

The rear surface 31a (the surface on which the engagement portion 41 is formed) of the base portion 31 stands the supporting column portion 21 up with respect to the backlight frame 72 by keeping contact with the interior surface (the bottom surface) 72a of the backlight frame 72. Thus, with a view to stand the supporting column portion 21 up stably, the rear surface 31a of the base portion 31 that keeps contact with the interior surface 72a of the backlight frame 72 desirably has a shape that allows a high degree of close contact with the interior surface 72a. For example, if the interior surface 72a of the backlight frame 72 is flat, it is desirable that the rear surface 31a of the base portion 31 also be flat.

The engagement portion 41 is a member that is connected to the rear surface 31a of the base portion 31, and that is for fitting the lamp clip LC itself to the interior surface (the mounting surface) 72a of the backlight frame 72. Specifically, the engagement portion 41 includes a project piece 42 and a catch piece 43.

The project piece 42 is a cylindrical piece (note that the shape of the cylinder may be circular or polygonal) with an outer diameter slightly smaller than the diameter of an open hole (unillustrated) formed in the backlight frame 72, and projects from the rear surface 31a of the base portion 31. By the project piece 42 being fitted into the open hole, the lamp clip LC is fixed to the interior surface 72a of the backlight frame 72 in the in-plane direction.

The catch piece 43 is formed at the tip of the project piece 42, and is a member caught by the edge of the open hole in the backlight frame 72. Accordingly, by the catch piece 43 being caught by the edge of the open hole, the lamp clip LC is fixed in the up-standing direction (the vertical direction or the like) with respect to the interior surface 72a of the backlight frame 72.

The weight 51 is a member fitted to the holding portion 11, the supporting column portion 21 in particular. The weight makes the vibration of the fluorescent tube 71 transmitted via the lamp clip LC less likely to be transmitted to the backlight frame 72.

Generally, the vibration of the fluorescent tube 71 results from a phenomenon based on the ON signal of the AC signal fed, and a phenomenon based on the OFF signal of the AC signal fed, of which both will be described below.

Specifically, the fluorescent tube 71 vibrates due to a phenomenon in which the fluorescent tube 71 approaches the backlight frame 72 due to the electromagnetic force based on the parasitic capacitance generated between the fluorescent tube 71 and the backlight frame 72 by the ON signal of the AC signal, and a phenomenon in which the fluorescent tube 71 tends to return to its original position due to the parasitic capacitance (hence the electromagnetic force) that disappears by the OFF signal of the AC signal. Furthermore, the vibration of the fluorescent tube 71 is transmitted via the lamp clip LC to the backlight frame 72, thus vibrating the backlight frame 72.

The lamp clip LC, however, includes the holding portion 11 including the grasping pieces 12 and 12 that grasp the fluorescent tube 71, and the supporting column portion 21 that supports the holding portion 11. Furthermore, the lamp clip LC has the weight 51 fitted to the supporting column portion 21.

The weight 51, with its own weight, slows the movement of the holding portion 11 and the supporting column portion 21 that shake in response to the vibration of the fluorescent tube 71. Then, the vibration of the fluorescent tube 71 is less likely to be transmitted, via the lamp clip LC that includes the supporting column portion 21 etc., to the backlight frame 72. That is, the weight 51 weakens the vibration of the fluorescent tube 71 transmitted via the lamp clip LC to the backlight frame 72.

If no vibration is transmitted to the backlight frame 72 as described above, the backlight frame 72 itself does not vibrate. In particular, when the AC signal of the fluorescent tube 71 is a light control signal, the light control signal has a wavelength included in an audible range of human hearing. Since the fluorescent tube 71 vibrates in synchronous with this wavelength, when the backlight frame 72 vibrates due to the vibration of the fluorescent tube 71, a harsh noise tends to occur.

However, if the backlight frame 72 does not vibrate, such noise is less likely to occur. Specifically, by the lamp clip LC weakening the vibration of the fluorescent tube 71, the vibration of the backlight frame 72 is prevented, and as a result, no noise from the backlight unit 82 occurs.

Other Embodiments

It should be understood that, in the embodiment described above, many other modifications and variations are possible within the scope of the present invention.

For example, the weight 51 may be formed integral with the supporting column portion 21 or be formed separate from the supporting column portion 21. That is, the lamp clip LC may be one piece including the weight 51, or may have the weight 51 fitted thereto as a separate member.

There is no particular limitation on the material of the weight 51 fitted to the lamp clip LC. It should be noted, however, from a viewpoint of weakening the vibration transmitted to the lamp clip LC, a material with a large specific gravity, such as metal, is desirable.

From the same viewpoint, in the lamp clip LC, at least one of the supporting column portion 21, the base portion 31, the engagement portion 41, and the branch piece 13 of the holding portion 11 is desirably metal.

There is no particular limitation on the position of the weight 51 fitted to the supporting column portion 21. Specifically, the weight 51 may be located at various places such as a place of the supporting column portion 21 most proximate to the holding portion 11 (the branch portion 13 to be specific), a place of the supporting column portion 21 most proximate to the base portion 31, and furthermore a place at and around the middle of the supporting column portion 21.

With a view to grasping two fluorescent tubes 71 at the same time, the holding portion 11 in the lamp clip LC has two grasping pieces 12 and 12, and the branch piece 13 (bifurcate branch piece 13) connecting those two grasping pieces 12 and 12. This, however, is in no way meant as a limitation.

Specifically, the number of grasping pieces 12 of the lamp clip LC may be one, or be three or more. When the grasping piece 12 is one, the branch piece 13 may be omitted and the grasping piece 12 may be formed at the tip of the supporting column portion 21. When the grasping piece 12 is three or more, the branch piece 13 may be trifurcate according to the number of the grasping pieces 12. The point is, the lamp clip LC may be so formed as to be able to grasp and support the fluorescent tube 71.

Figure 5:
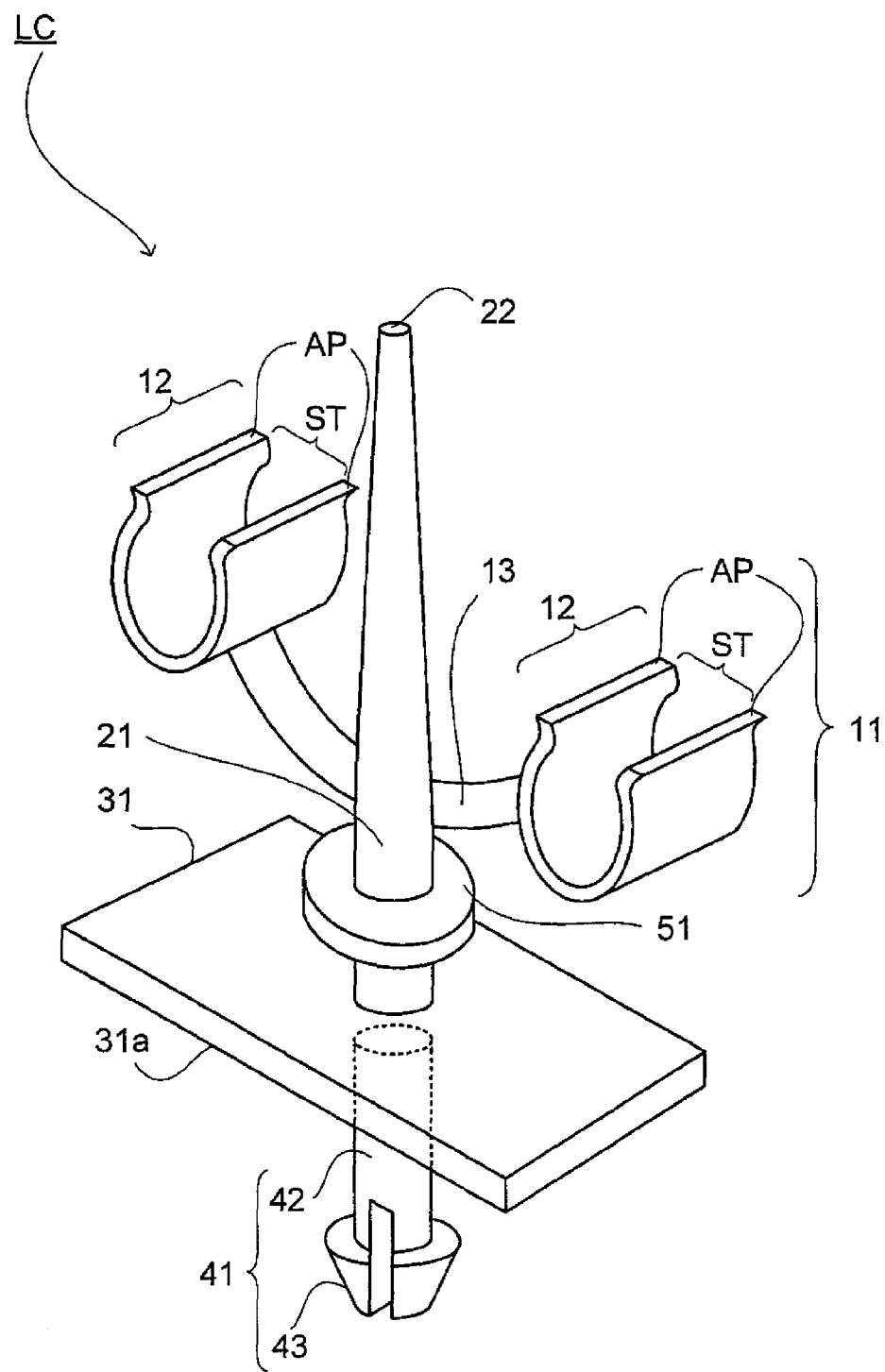
FIG. 5 A perspective view showing another example of the lamp clip in FIG. 1.
Figure 6:
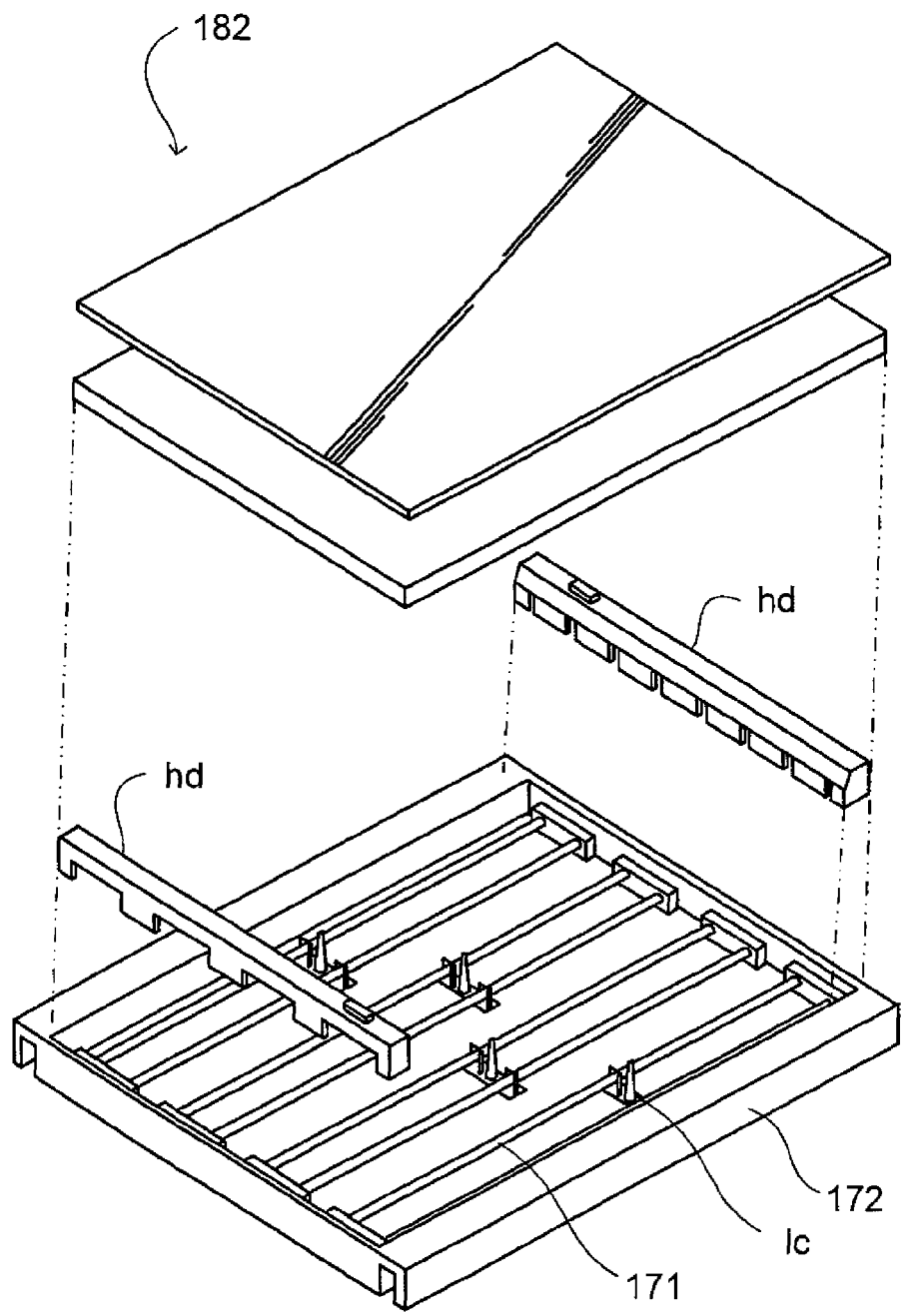
FIG. 6 An exploded perspective view of a backlight unit included in a conventional liquid crystal display device.

The lamp clip LC is covered by the diffusion sheet 73. Thus, as shown in FIG. 5, the supporting column portion 21 may support the branch piece 13 and may project through that branch piece 13 and extend in the columnar direction, so that the tip 22 is located above the grasping piece 12.

Arranging a plurality of such lamp clips LC allows the tip 22 of each supporting column portion 21 to make contact with the diffusion sheet 73. Thus, the diffusion sheet 73 is supported by the lamp clip LC. That is, the lamp clip LC not only supports the fluorescent tube 71 but also supports the diffusion sheet 73.

The invention claimed is:

1. A linear light source holding base comprising:
    a holding portion including a grasping piece that is arranged to grasp a linear light source;
    a supporting column portion arranged to support the holding portion; and
    a damper fitted to the supporting column portion; wherein
    the damper is arranged to reduce, due to the weight of the damper, a movement of the holding portion and the supporting column with respect to other portions of the holding base, the movement of the holding portion and the supporting column being caused by vibration of the linear light source.

2. The linear light source holding base according to claim 1,
    wherein at least one of the damper and the supporting column portion is metal.

3. A backlight unit comprising:
    the linear light source supporting base according to claim 2; and
    a linear light source held by the linear light source holding base.

4. A liquid crystal display device comprising:
    the backlight unit according to claim 3; and
    a liquid crystal display panel receiving light from the backlight unit.

5. The linear light source holding base according to claim 1,
    wherein, a base portion is defined on the supporting column portion at an end thereof opposite from where the holding portion is located, the base portion being arranged to support the supporting column portion, and wherein the base portion is metal.

6. The linear light source holding base according to claim 5,
wherein, on the base portion, there is defined an engagement portion arranged to engage with a mounting surface that keeps contact with the base portion, and
wherein the engagement portion is metal.

7. A backlight unit comprising:
the linear light source supporting base according to claim 6; and
a linear light source held by the linear light source holding base.

8. A liquid crystal display device comprising:
the backlight unit according to claim 7; and
a liquid crystal display panel receiving light from the backlight unit.

9. A backlight unit comprising:
the linear light source supporting base according to claim 5; and
a linear light source held by the linear light source holding base.

10. A liquid crystal display device comprising:
the backlight unit according to claim 9; and
a liquid crystal display panel receiving light from the backlight unit.

11. The linear light source holding base according to claim 1, wherein the holding portion comprises:
as the grasping piece, a plurality of grasping pieces; and
a branch piece connecting the grasping pieces, and
wherein the branch piece is metal.

12. A backlight unit comprising:
the linear light source supporting base according to claim 11; and
a linear light source held by the linear light source holding base.

13. A liquid crystal display device comprising:
the backlight unit according to claim 12; and
a liquid crystal display panel receiving light from the backlight unit.

14. A backlight unit comprising:
the linear light source supporting base according to claim 1; and
a linear light source held by the linear light source holding base.

15. A liquid crystal display device comprising:
the backlight unit according to claim 14; and
a liquid crystal display panel receiving light from the backlight unit.

* * * * *